(12) United States Patent
Tiainen et al.

(10) Patent No.: US 12,245,145 B2
(45) Date of Patent: Mar. 4, 2025

(54) BASE STATION BATTERY CONTROL

(71) Applicant: NOKIA SOLUTIONS AND NETWORKS OY, Espoo (FI)

(72) Inventors: Risto Olavi Tiainen, Espoo (FI); Seppo Olavi Hämäläinen, Helsinki (FI); Kimmo Kalervo Hätönen, Helsinki (FI); Olli Pekka Salmela, Helsinki (FI); Topi Tuomas Volkov, Kantvik (FI)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 18/371,053

(22) Filed: Sep. 21, 2023

(65) Prior Publication Data

US 2024/0107445 A1  Mar. 28, 2024

(30) Foreign Application Priority Data

Sep. 28, 2022 (FI) .................................. 20225850

(51) Int. Cl.
*H04W 52/02* (2009.01)
*H02J 3/00* (2006.01)
*G06Q 50/06* (2012.01)

(52) U.S. Cl.
CPC ......... *H04W 52/0206* (2013.01); *H02J 3/008* (2013.01); *G06Q 50/06* (2013.01)

(58) Field of Classification Search
CPC ..... H04W 52/0206; H02J 3/008; G06Q 50/06
USPC ........................................................ 370/311
See application file for complete search history.

(56) References Cited

U.S. PATENT DOCUMENTS

| | | | | |
|---|---|---|---|---|
| 2013/0176000 | A1* | 7/2013 | Bishop | ............ H02J 7/00 320/149 |
| 2014/0171140 | A1* | 6/2014 | Iwabuchi | ............ H04W 24/10 455/522 |
| 2017/0070069 | A1* | 3/2017 | Li | ............ H02J 7/0044 |
| 2023/0060523 | A1* | 3/2023 | Dow | ............ B60L 53/67 |

FOREIGN PATENT DOCUMENTS

| | | |
|---|---|---|
| CN | 107658960 A | 2/2018 |
| CN | 106102095 B | 5/2020 |
| CN | 112269966 A | 1/2021 |
| CN | 113422390 A | 9/2021 |

(Continued)

OTHER PUBLICATIONS

Office Action dated Mar. 14, 2023 corresponding to Finnish Patent Application No. 20225850.

(Continued)

*Primary Examiner* — Kwang B Yao
*Assistant Examiner* — Syed M Bokhari
(74) *Attorney, Agent, or Firm* — SQUIRE PATTON BOGGS (US) LLP

(57) ABSTRACT

Disclosed is a method comprising transmitting one or more requests for charging or discharging batteries of a plurality of base stations, wherein the plurality of base stations comprise at least a first group of base stations associated with a first communications service provider, and a second group of base stations associated with a second communications service provider different to the first communications service provider.

12 Claims, 9 Drawing Sheets

1001 | Transmit request for charging/discharging

(56) References Cited

FOREIGN PATENT DOCUMENTS

WO 2021/148127 A1 7/2021

OTHER PUBLICATIONS

Finnish Search Report dated Mar. 14, 2023 corresponding to Finnish Patent Application No. 20225850.
Communication of Acceptance dated Aug. 28, 2023 corresponding to Finnish Patent Application No. 20225850.
Extended European Search Report issued in corresponding European Patent Application No. 23198155.6 dated Feb. 26, 2024.
Pei Yong et al., "Evaluating the Dispatchable Capacity of Base Station Backup Batteries in Distribution Networks", IEEE Transactions on Smart Grid, vol. 12, No. 5, Apr. 21, 2021.
Ilari Alaperä, "Usage of telecommunication base station batteries in demand response for frequency containment disturbance reserve: Motivation, background and pilot results", 2017 IEEE International Telecommunications Energy Conference (INTELEC), Oct. 22, 2017.

* cited by examiner

BASE STATION BATTERY CONTROL

CROSS REFERENCE TO RELATED APPLICATION

This application claims the benefit of Finnish Patent Application No. 20225850, filed Sep. 28, 2022. The entire content of the above-referenced application is hereby incorporated by reference.

FIELD

The following example embodiments relate to wireless communication and to energy storage.

BACKGROUND

The availability of some energy sources, such as solar and wind power, may be intermittent. In addition, energy demand may fluctuate during different times of day, for example. It is desirable to provide energy storage solutions in order to ensure a constant supply of energy from a power grid despite of fluctuations in power production and/or energy demand.

BRIEF DESCRIPTION

The scope of protection sought for various example embodiments is set out by the independent claims. The example embodiments and features, if any, described in this specification that do not fall under the scope of the independent claims are to be interpreted as examples useful for understanding various embodiments.

According to an aspect, there is provided an apparatus comprising at least one processor, and at least one memory storing instructions which, when executed by the at least one processor, cause the apparatus at least to: select one or more groups of base stations from multiple groups of base stations of multiple communications service providers for charging or discharging batteries of the one or more groups of base stations, wherein the selection is based at least on one or more agreements with the multiple communications service providers, wherein the one or more agreements indicate a promised battery capacity of the multiple communications service providers; and transmit one or more requests for charging or discharging the batteries of the one or more groups of base stations, wherein the one or more groups of base stations comprise at least a first group of base stations associated with a first communications service provider, and a second group of base stations associated with a second communications service provider different to the first communications service provider.

According to another aspect, there is provided an apparatus comprising: means for selecting one or more groups of base stations from multiple groups of base stations of multiple communications service providers for charging or discharging batteries of the one or more groups of base stations, wherein the selection is based at least on one or more agreements with the multiple communications service providers, wherein the one or more agreements indicate a promised battery capacity of the multiple communications service providers; and means for transmitting one or more requests for charging or discharging the batteries of the one or more groups of base stations, wherein the one or more groups of base stations comprise at least a first group of base stations associated with a first communications service provider, and a second group of base stations associated with a second communications service provider different to the first communications service provider.

According to another aspect, there is provided a method comprising: selecting one or more groups of base stations from multiple groups of base stations of multiple communications service providers for charging or discharging batteries of the one or more groups of base stations, wherein the selection is based at least on one or more agreements with the multiple communications service providers, wherein the one or more agreements indicate a promised battery capacity of the multiple communications service providers; and transmitting one or more requests for charging or discharging the batteries of the one or more groups of base stations, wherein the one or more groups of base stations comprise at least a first group of base stations associated with a first communications service provider, and a second group of base stations associated with a second communications service provider different to the first communications service provider.

According to another aspect, there is provided a computer program comprising instructions which, when executed by an apparatus, cause the apparatus to perform at least the following: selecting one or more groups of base stations from multiple groups of base stations of multiple communications service providers for charging or discharging batteries of the one or more groups of base stations, wherein the selection is based at least on one or more agreements with the multiple communications service providers, wherein the one or more agreements indicate a promised battery capacity of the multiple communications service providers; and transmitting one or more requests for charging or discharging the batteries of the one or more groups of base stations, wherein the one or more groups of base stations comprise at least a first group of base stations associated with a first communications service provider, and a second group of base stations associated with a second communications service provider different to the first communications service provider.

According to another aspect, there is provided a computer readable medium comprising program instructions which, when executed by an apparatus, cause the apparatus to perform at least the following: selecting one or more groups of base stations from multiple groups of base stations of multiple communications service providers for charging or discharging batteries of the one or more groups of base stations, wherein the selection is based at least on one or more agreements with the multiple communications service providers, wherein the one or more agreements indicate a promised battery capacity of the multiple communications service providers; and transmitting one or more requests for charging or discharging the batteries of the one or more groups of base stations, wherein the one or more groups of base stations comprise at least a first group of base stations associated with a first communications service provider, and a second group of base stations associated with a second communications service provider different to the first communications service provider.

According to another aspect, there is provided a non-transitory computer readable medium comprising program instructions which, when executed by an apparatus, cause the apparatus to perform at least the following: selecting one or more groups of base stations from multiple groups of base stations of multiple communications service providers for charging or discharging batteries of the one or more groups of base stations, wherein the selection is based at least on one or more agreements with the multiple communications service providers, wherein the one or more agreements indicate a promised battery capacity of the multiple communications service providers; and transmitting one or more requests for charging or discharging the batteries of the one or more groups of base stations, wherein the one or more groups of base stations comprise at least a first group of base stations associated with a first communications service provider, and a second group of base stations associated with a second communications service provider different to the first communications service provider.

LIST OF DRAWINGS

In the following, various example embodiments will be described in greater detail with reference to the accompanying drawings, in which FIG. 1 illustrates an example of a cellular communication network;

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different example embodiments will be described using, as an example of an access architecture to which the example embodiments may be applied, a radio access architecture based on long term evolution advanced (LTE Advanced, LTE-A), new radio (NR, 5G), beyond 5G, or sixth generation (6G) without restricting the example embodiments to such an architecture, however. It is obvious for a person skilled in the art that the example embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
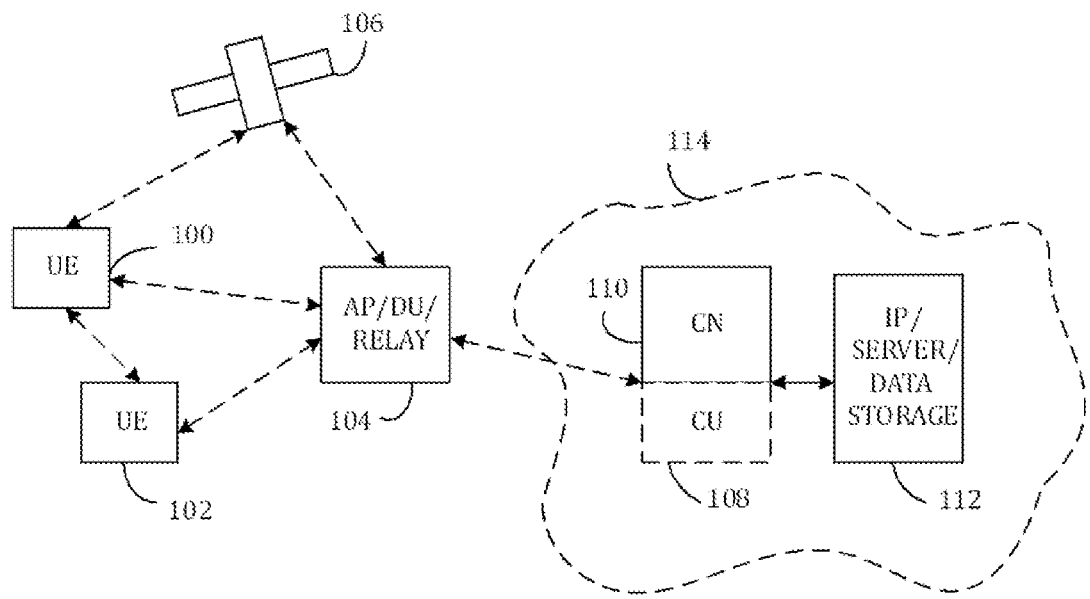

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The example embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a radio cell with an access node (AN) 104, such as an evolved Node B (abbreviated as eNB or eNodeB) or a next generation Node B (abbreviated as gNB or gNodeB), providing the radio cell. The physical link from a user device to an access node may be called uplink (UL) or reverse link, and the physical link from the access node to the user device may be called downlink (DL) or forward link. A user device may also communicate directly with another user device via sidelink (SL) communication. It should be appreciated that access nodes or their functionalities may be implemented by using any node, host, server or access point etc. entity suitable for such a usage.

A communication system may comprise more than one access node, in which case the access nodes may also be configured to communicate with one another over links, wired or wireless, designed for the purpose. These links may be used for signaling purposes and also for routing data from one access node to another. The access node may be a computing device configured to control the radio resources of communication system it is coupled to. The access node may also be referred to as a base station, a base transceiver station (BTS), an access point or any other type of interfacing device including a relay station capable of operating in a wireless environment. The access node may include or be coupled to transceivers. From the transceivers of the access node, a connection may be provided to an antenna unit that establishes bi-directional radio links to user devices. The antenna unit may comprise a plurality of antennas or antenna elements. The access node may further be connected to a core network 110 (CN or next generation core NGC). Depending on the deployed technology, the counterpart that the access node may be connected to on the CN side may be a serving gateway (S-GW, routing and forwarding user data packets), packet data network gateway (P-GW) for providing connectivity of user devices to external packet data networks, user plane function (UPF), mobility management entity (MME), or an access and mobility management function (AMF), etc.

The user device illustrates one type of an apparatus to which resources on the air interface may be allocated and assigned, and thus any feature described herein with a user device may be implemented with a corresponding apparatus, such as a relay node.

An example of such a relay node may be a layer 3 relay (self-backhauling relay) towards the access node. The self-backhauling relay node may also be called an integrated access and backhaul (IAB) node. The IAB node may comprise two logical parts: a mobile termination (MT) part, which takes care of the backhaul link(s) (i.e., link(s) between IAB node and a donor node, also known as a parent node) and a distributed unit (DU) part, which takes care of the access link(s), i.e., child link(s) between the IAB node and user device (s), and/or between the IAB node and other IAB nodes (multi-hop scenario).

Another example of such a relay node may be a layer 1 relay called a repeater. The repeater may amplify a signal received from an access node and forward it to a user device, and/or amplify a signal received from the user device and forward it to the access node.

The user device may also be called a subscriber unit, mobile station, remote terminal, access terminal, user terminal, terminal device, or user equipment (UE) just to mention but a few names or apparatuses. The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, multimedia device, reduced capability (RedCap) device, wireless sensor device, or any device integrated in a vehicle.

It should be appreciated that a user device may also be a nearly exclusive uplink-only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable or wearable device with radio parts (such as a watch, earphones or eyeglasses) and the computation may be carried out in the cloud or in another user device. The user device (or in some example embodiments a layer 3 relay node) may be configured to perform one or more of user equipment functionalities.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave-mmWave). One of the concepts considered to be used in 5G networks may be network slicing, in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with one or more other networks, such as a public switched telephone network or the Internet, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or the like, providing facilities for networks of different operators to cooperate for example in spectrum sharing.

An access node may also be split into: a radio unit (RU) comprising a radio transceiver (TRX), i.e., a transmitter (Tx) and a receiver (Rx); one or more distributed units (DUs) 105 that may be used for the so-called Layer 1 (L1) processing and real-time Layer 2 (L2) processing; and a central unit (CU) 108 (also known as a centralized unit) that may be used for non-real-time L2 and Layer 3 (L3) processing. The CU 108 may be connected to the one or more DUs 105 for example via an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU 108 may be defined as a logical node hosting higher layer protocols, such as radio resource control (RRC), service data adaptation protocol (SDAP) and/or packet data convergence protocol (PDCP), of the access node. The DU 105 may be defined as a logical node hosting radio link control (RLC), medium access control (MAC) and/or physical (PHY) layers of the access node. The operation of the DU may be at least partly controlled by the CU. The CU may comprise a control plane (CU-CP), which may be defined as a logical node hosting the RRC and the control plane part of the PDCP protocol of the CU for the access node. The CU may further comprise a user plane (CU-UP), which may be defined as a logical node hosting the user plane part of the PDCP protocol and the SDAP protocol of the CU for the access node.

Cloud computing platforms may also be used to run the CU 108 and/or DU 105. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of functions between the above-mentioned access node units, or different core network operations and access node operations, may differ.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or an access node comprising radio parts. It is also possible that node operations may be distributed among a plurality of servers, nodes or hosts. Application of cloudRAN architecture enables RAN real-time functions being carried out at the RAN side (e.g., in a DU 105) and non-real-time functions being carried out in a centralized manner (e.g., in a CU 108).

It should also be understood that the distribution of functions between core network operations and access node operations may differ from that of the LTE or even be non-existent. Some other technology advancements that may be used include big data and all-IP, which may change the way networks are being constructed and managed. 5G (or new radio, NR) networks may be designed to support multiple hierarchies, where MEC servers may be placed between the core and the access node. It should be appreciated that MEC may be applied in 4G networks as well.

5G may also utilize non-terrestrial communication, for example satellite communication, to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). A given satellite 106 in the mega-constellation may cover several satellite-enabled network entities that create on-ground cells. The on-ground cells may be created through an on-ground relay node or by an access node 104 located on-ground or in a satellite.

6G networks are expected to adopt flexible decentralized and/or distributed computing systems and architecture and ubiquitous computing, with local spectrum licensing, spectrum sharing, infrastructure sharing, and intelligent automated management underpinned by mobile edge computing, artificial intelligence, short-packet communication and blockchain technologies. Key features of 6G may include intelligent connected management and control functions, programmability, integrated sensing and communication, reduction of energy footprint, trustworthy infrastructure, scalability and affordability. In addition to these, 6G is also targeting new use cases covering the integration of localization and sensing capabilities into system definition to unifying user experience across physical and digital worlds.

It is obvious for a person skilled in the art that the depicted system is only an example of a part of a radio access system and in practice, the system may comprise a plurality of access nodes, the user device may have access to a plurality of radio cells and the system may also comprise other apparatuses, such as physical layer relay nodes or other network elements, etc. At least one of the access nodes may be a Home eNodeB or a Home gNodeB.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The access node(s) of FIG. 1 may provide any kind of these cells. A cellular radio system may be implemented as a multilayer network including several kinds of radio cells. In multilayer networks, one access node may provide one kind of a radio cell or radio cells, and thus a plurality of access nodes may be needed to provide such a network structure.

For fulfilling the need for improving the deployment and performance of communication systems, the concept of "plug-and-play" access nodes may be introduced. A network which may be able to use "plug-and-play" access nodes, may include, in addition to Home eNodeBs or Home gNodeBs, a Home Node B gateway, or HNB-GW (not shown in FIG. 1). An HNB-GW, which may be installed within an operator's network, may aggregate traffic from a large number of Home eNodeBs or Home gNodeBs back to a core network.

Energy systems are currently under a major change due to climate change and geopolitical reasons. Renewable energy is becoming a mainstream solution due to gradual reduction of energy resources, whose burning produces carbon dioxide. Renewable energy resources include solar and wind power, for example. As the availability of these renewable energy resources may be intermittent, it may be necessary to store the energy by using batteries, for example.

The technological development in battery chemistry has resulted in moving from lead-acid batteries to lithium-ion (Li-ion) batteries, which have a much higher energy density compared to lead-acid batteries. Lithium-ion batteries are also beneficial due to their capability to handle cyclic loading. The same applies also in virtual power plant (VPP) use. Lead-acid batteries may not be as suitable as Li-ion batteries for VPP, as the performance of lead-acid batteries tends to deteriorate quickly under cyclic loading.

A virtual power plant may be defined as a collection of energy storages possibly owned by one or more parties, but controlled together as one collection of energy sources that can provide electrical energy to a power grid (e.g., when energy demand is high compared to supply), and store electrical energy from the power grid (e.g., when energy demand is low compared to supply). For example, at night, energy demand may generally be lower than during daytime. A power grid may also be referred to as an electricity grid herein.

While a base station of a wireless communication network may use a power grid (electrical grid) as its main power source, the base station may comprise one or more batteries as a back-up power source that may be used during power outages, for example. The back-up batteries of one or more base stations may be organized as a virtual power plant that can be operated as a separate entity or integrated to a VPP of an electricity operator. Such a scheme may also be referred to as a radio network virtual power plant herein.

As a non-limiting example, the back-up battery capacity of a single base station may be approximately 400 Ah (at 48 V). Thus, assuming for example 10 million base stations globally, the back-up battery capacity of these base stations would be approximately 100 GWh in total.

When discharging a battery of a base station, the discharged energy can be used to operate the base station (i.e., using the battery as a power source instead of the power grid), or the discharged energy can be provided back to the power grid. For example, the batteries of the base station may be charged from the power grid at night (during low energy demand), and then discharged back to the power grid during daytime (when energy demand is higher). As another example, the discharging may be started when electricity supply and demand are not matching, as indicated by the measured frequency of the power grid. The frequency of the power grid may be lower when energy demand is high compared to supply, and the frequency may be higher when energy demand is low compared to supply.

Alternatively, the battery of one base station may be discharged to a battery of another base station. For example, during the day (during high energy demand) energy may be transferred from a "residential" base station to a "business center" base station. On the other hand, during the night (during low energy demand), energy may be transferred from the "business center" base station to the "residential" base station. In this case, the transfer is a battery-to-battery transfer in direct current (DC). The discharging can be done when the base station is operating in a normal state, i.e., when no alarms are triggered that would prevent discharge.

However, the amount of discharged energy may need to be limited, so that the remaining battery level meets regulatory requirements. For example, regulatory requirements may require that the base station is able to operate for at least two to four hours on battery power (e.g., in case of a power outage). It should be noted that the specific amount of time in the regulatory requirements may vary in different geographical areas or countries. As the regulatory requirements for the minimum time for battery operation may vary based on geographical area, a location-based service may be used to determine the needed action.

The sufficient battery level to meet these regulatory requirements may be determined based on the historical information of the base station, for example regarding its data traffic (e.g., at different times of the day, days of the week, holidays, events, etc.). The data traffic history of the base station may be collected by a network management system (NMS) or other network element or application in the operator's network. The NMS is a server that uses FCAPS (fault, configuration, accounting, performance and security) information to manage a data network. The network management system may also be referred to as a network management station or network management tools. In addition to network key performance indicators (KPIs), the decision may involve other KPIs, such as measurements for the power consumption of the base station. When discharging energy from the batteries to the power grid, the time to recharge the batteries may also be taken into account.

Furthermore, it is possible for base station batteries to be over-dimensioned for VPP purposes. The over-dimensioning means that the battery capacity may be larger than normally used for base stations (without VPP). This gives more flexibility to use batteries for VPP purposes as described herein.

The decision-making architecture for VPP use may be centralized (e.g., NMS provides charging/discharging instructions to the base station), distributed (e.g., the base station itself or its battery control unit makes the decisions independently) or based on a hybrid model (e.g., the NMS and the base station may both be involved in the decision-making).

Some example embodiments provide a VPP setup that includes a "broker" role. This broker may be referred to as a VPP broker herein. The VPP broker may manage several communication service provider (CSP) resources simultaneously. The VPP broker may be implemented as a computer program (software) running in a server or in a cloud, for example.

Figure 2:
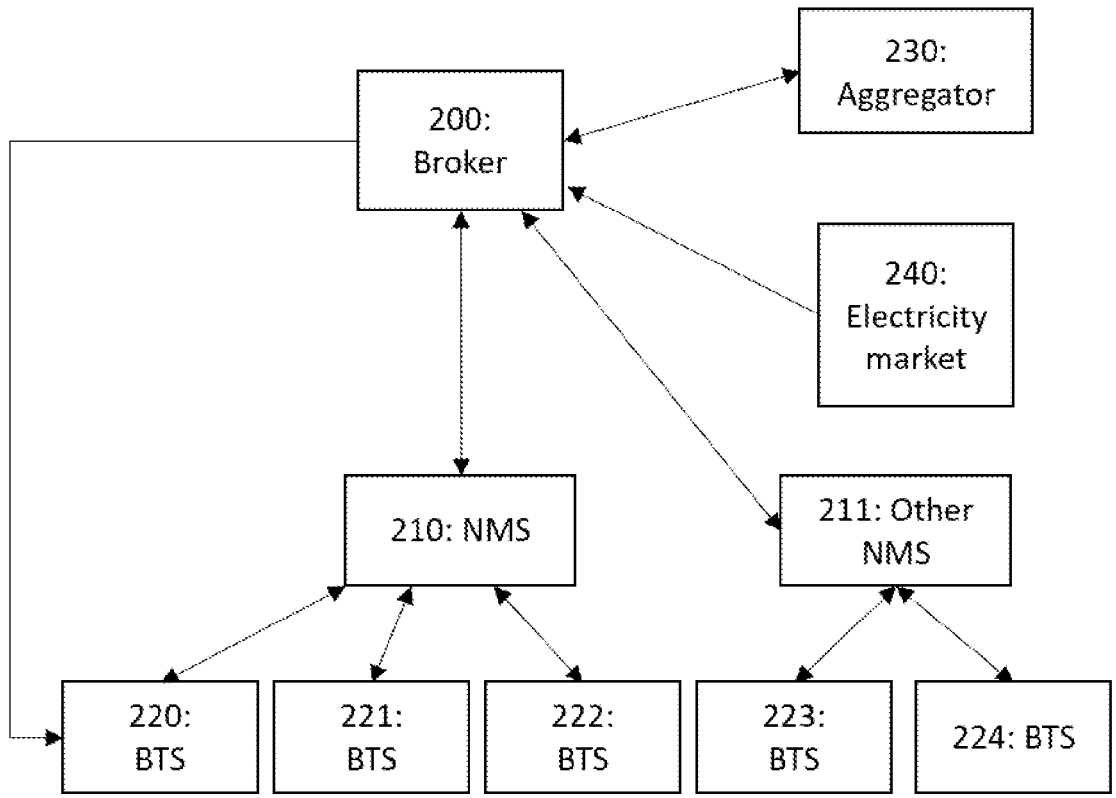
FIG. 2 illustrates an example of a system.

FIG. 2 illustrates an example of a system, to which some example embodiments may be applied. The communication in the system may occur via wired or wireless connections between the elements of the system. The communication between the elements of the system may be encrypted or otherwise protected to ensure secure operation.

The system may comprise at least a VPP broker 200, one or more NMSs 210, 211, a plurality of base stations 220, 221, 222, 223, 224 one or more VPP aggregators 230, and an electricity market 240. It should be noted that some other network element may alternatively be used instead of the NMSs 210, 211 for collecting KPIs and making decisions.

The NMSs 210, 211 may be associated with different CSPs. The NMS 210 may be configured to communicate with a first group of base stations 220, 221, 222 associated with a first CSP, and the other NMS 211 may be configured to communicate with a second group of base stations 223, 224 associated with a second CSP. It should be noted that the number of base stations in a given group may also be different than shown in FIG. 2.

The VPP broker 200 may act as a mediator between one or more CSPs and the one or more VPP aggregators 230. The VPP broker 200 may be used to estimate the total VPP capacity over multiple CSP networks in a given geographical area. The VPP broker 200 may distribute VPP requests to CSPs according to their market share. The VPP broker 200 may have VPP-related agreements and/or policies with CSPs and the one or more VPP aggregators 230. An example of a policy is the electricity price level, at which VPP can be activated. The role of the VPP broker may also include anonymization of CSP data and service-level agreement (SLA) fulfilment.

The VPP broker 200 may be configured to receive a capacity profile and/or a data traffic profile from a given NMS 210, 211 (or other network element) per time unit. The capacity profile may indicate an available energy amount and time for spare electricity at the batteries of the base stations of the CSP network. The data traffic profile may indicate estimated or forecasted data traffic volume of the base stations of the CSP network at different times. The VPP broker 200 may be further configured to receive other information from a given NMS 210, 211 (or other network element), such as a number of the base stations in the CSP network. The VPP broker 200 may be further configured to receive electricity price information from the electricity market 240.

The VPP broker 200 may be further configured to estimate the total available VPP capacity over one or more CSP networks in a given geographical area based on the agreements with CSPs and the profile and/or other information received from the one or more NMSs 210, 211 (or other network element). The VPP broker 200 may be configured to indicate the total available VPP capacity to the one or more VPP aggregators 230.

The VPP broker 200 may be further configured to receive a VPP request from the one or more VPP aggregators 230.

Based on the received VPP request, the VPP broker 200 may be further configured to send VPP requests to the one or more NMSs 210, 211 (or other network element) or directly to the base stations 220, 221, 222, 223, 224. With the VPP request, the VPP broker 200 may request a given base station to participate in VPP in the corresponding geographical area (e.g., to charge or discharge the BTS batteries). The VPP broker 200 may distribute the VPP requests to CSPs according to their market share in order to enable local optimization of energy consumption between different companies/CSPs.

For sending the VPP requests, the VPP broker 200 may be configured to determine which type of VPP actions can be taken and which base stations should participate in the VPP actions (e.g., charging or discharging). These decisions may be based on at least one of the following: the policies and agreements with CSPs and the one or more VPP aggregators 230, network statistics collected from the one or more NMSs 210, 211 (or other network element), alarms and performance of the base stations 220, 221, 222, 223, 224 and/or other data sources such as weather forecasts and other data from the internet.

The VPP broker may support the power grid to provide a stable supply of energy despite of fluctuations in power production and/or energy demand. For example, the back-up batteries of the base stations may be discharged to provide energy to the power grid, when energy demand is high compared to production. On the other hand, the back-up batteries may be charged, when energy demand is low compared to production.

By using the VPP broker, the operator or CSP does not need to understand how to deal with the electricity market or the technical details of electricity systems. In addition, CSP(s) can make an agreement with a single partner (the broker) instead of multiple partners (aggregators). Similarly, aggregators can make an agreement with a single partner (the broker) instead of multiple partners (e.g., CSPs or other VPPs). The market share can be allocated based on agreements/policies with operators. Furthermore, the VPP broker may optimize the use of Li-ion or lead-acid batteries to minimize charging-discharging cycles of lead-acid batteries.

A given NMS 210, 211 (or other network element) may be configured to create a capacity profile based on reporting from the corresponding group of base stations 220, 221, 222, 223, 224 in the CSP network, and to send the capacity profile for the whole CSP network to the VPP broker 200. Alternatively, or additionally, the NMS 210 (or other network element) may create a capacity profile per base station 220, 221, 222, 223, 224 in the CSP network, and report the base-station-specific profiles to the VPP broker 200. A given NMS 210, 211 (or other network element) may be specific to a given operator (CSP network). The NMS 210, 211 (or other network element) may be further configured to send VPP profiles to the corresponding base stations 220, 221, 222, 223, 224, wherein a given VPP profile indicates the energy amount, battery level, etc. at a given base station per time unit. The VPP profile may also be referred to as a capacity profile herein.

A given base station 220, 221, 222, 223, 224 may be configured to send fault management (FM) data, performance management (PM) data, log data, and/or event data to the NMS 210, 211 (or other network element). Alternatively, or additionally, the NMS 210, 211 (or other network element) may receive power consumption information and/or battery information directly from the power system at the cell site. The base station 220, 221, 222, 223, 224 may be further configured to perform VPP actions (e.g., charging or discharging) based on the VPP request received from the VPP broker 200 or NMS 210, 211 (or other network element), and the VPP profile received from the NMS 210, 211 (or other network element).

A prerequisite may be that the VPP use does not conflict with the primary network tasks of the base station. When it comes to actual VPP functionality, the fault management (FM) data, performance management (PM) data, log data, and/or event data may impact the potential for VPP use. In addition to that, the battery type (lead-acid/Li-ion, nominal capacity) and condition (state of charge, how many cyclic loads can be safely run) of the base station batteries dictate the potential amount of energy and for how long energy can be released (discharged) for VPP use.

In addition to CSPs, other companies from other industries can also become clients of the VPP broker and have their own NMS 210, 211 (or other network element).

The VPP aggregator 230 is an entity that aggregates multiple power sources to one entity. The VPP aggregator 230 may aggregate multiple small power reserves (e.g., companies, factories, shopping malls, base stations, etc., with batteries). The VPP aggregator 230 may be used to aggregate small power reserves so that a large enough power reserve can be provided to a power grid operator (e.g., Fingrid). In other words, the aggregation may mean combining smaller electricity production, consumption and storage sites that are capable of balancing into larger packages that can be offered on one or more electricity marketplaces. In addition, the VPP aggregator 230 may perform on-line validation of the timing and accuracy requirement of different power reserves before aggregation. The VPP aggregator 230 may be configured to send a VPP request to the VPP broker 200 to start or stop discharging the batteries of the base stations 220, 221, 222, 223, 224.

Figure 3:
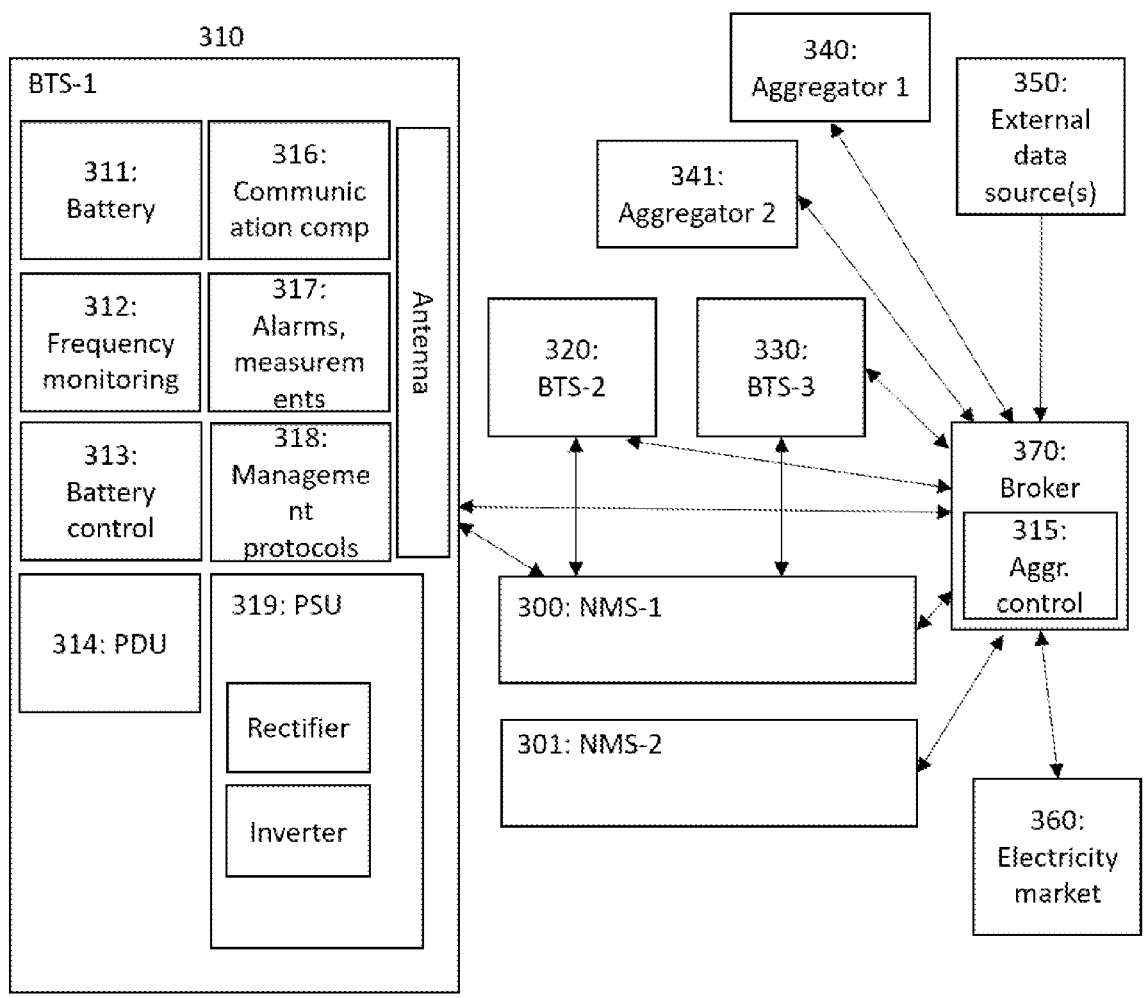
FIG. 3 illustrates an example of a system.

FIG. 3 illustrates another example of a system, to which some example embodiments may be applied. As can be seen in FIG. 3, the VPP broker 370 may utilize multiple CSP customer resources and provide access to the electricity market 360.

The VPP broker 370 may obtain or receive input data from one or more external data sources 350 (e.g., internet, and/or power grid control system), from the electricity market 360, from the first base station 310, from one or more neighbor base stations 320, 330, from a first NMS 300, and/or from a second NMS 301. The first NMS 300 and the second NMS 301 may be associated with different CSPs and communicate with different groups of base stations.

The first NMS 300 may provide input data to the battery control unit 313. The functions of the VPP broker 370 and the NMS 300, 301 are described above with reference to FIG. 2.

The first base station 310 may comprise one or more batteries 311, a power grid frequency monitoring unit 312, a power distribution unit (PDU) 314, communication components 316, a unit 317 for alarms and measurements, management protocols 318, and/or a power supply unit (PSU) 319.

The PSU 319 may be used to supply electric power from the power grid via a rectifier to operate the first base station 310 and/or to charge the one or more batteries 311. The PSU 319 may also be used for discharging the one or more batteries 311 to the power grid via an inverter. The inverter is an electrical device or circuitry that converts direct current (DC) to alternating current (AC). The rectifier is an electrical device or circuitry that converts AC to DC.

The PDU 314 may be used to distribute electric power to the first base station 310, to or from the one or more batteries 311, and/or to or from the power grid via the PSU 319. The PDU 314 may also provide PSU status information (e.g., power consumption information) and/or battery status information of the one or more batteries 311 as input data to the battery control unit 313.

The battery control unit 313 may control the use of the one or more batteries 311 (e.g., charging/discharging). The battery control unit 313 may be comprised in the first NMS 300 or locally in the first base station 310. The battery control unit 313 may transmit an indication/command/message to the PDU 314 to perform the actual charging or discharging of the one or more batteries 311 according to the VPP request received from the VPP broker 370.

The charging means that the one or more batteries 311 are charged with energy provided from the power grid via the PSU 319.

The discharging may mean that the one or more batteries 311 are used as a power source to operate the first base station 310 (instead of using the power grid as the power source), or that the one or more batteries 311 are discharged to the power grid via the inverter for a certain time and energy amount. Alternatively, the discharging may mean that the one or more batteries 311 of the first base station 310 are discharged to the second base station 320 or third base station 330 for a certain time and energy amount (e.g., to operate the second base station or to charge one or more batteries of the second base station).

The power grid frequency monitoring unit 312 may be configured to measure the frequency of the power grid and to provide the measurement information to the battery control unit 313 as input data for its decision-making. Alternatively, or additionally, the battery control unit 313 may be configured to receive the measurement information regarding the frequency of the power grid from the NMS 300 or other network element. Alternatively, or additionally, the battery control unit 313 may be configured to receive commands and/or guidelines from the NMS 300 or other network element to be used as input data for its decision-making. The commands and/or guidelines may comprise, for example, one or more frequency boundaries for the power grid, wherein the one or more frequency boundaries indicate a threshold when to trigger the charging or discharging. As another example, the commands may comprise an explicit command to start or stop discharging the one or more batteries 311 to the power grid, or to start or stop operating the first base station 310 with battery power (instead of drawing energy from the power grid to operate the first base station 310).

The VPP broker 370 may comprise a VPP aggregator control unit 315 that may be configured to receive requests/commands from a VPP aggregator 340, 341. The VPP aggregator 340, 341 is an entity that aggregates multiple power sources to one entity. The VPP aggregator 340, 341 may transmit a request/command to the VPP aggregator control unit 315 to start or stop discharging the one or more batteries 311. The VPP aggregator control unit 315 may forward the request/command to the battery control unit 313.

Figure 4:
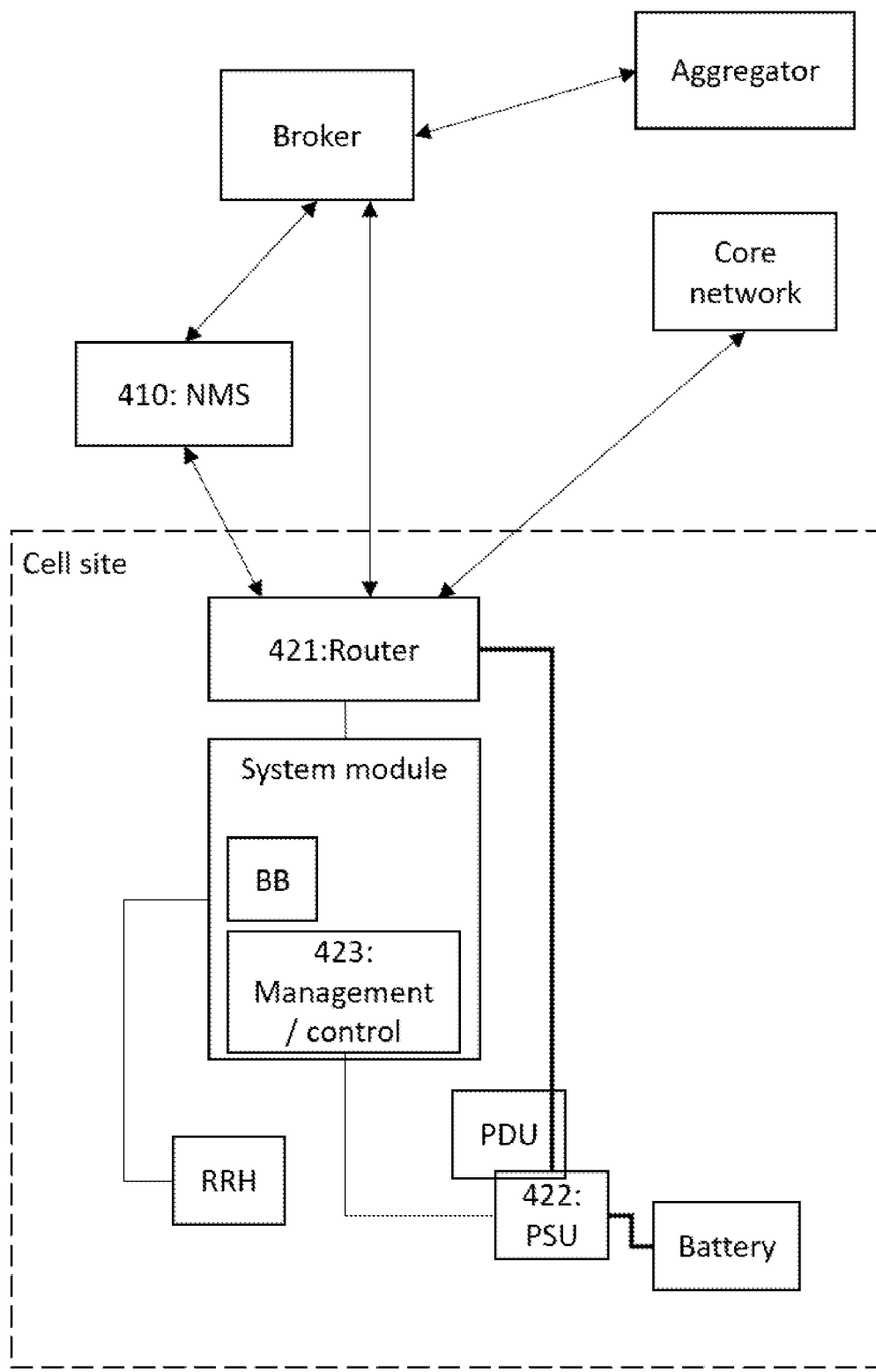
FIG. 4 illustrates an example of a system.

FIG. 4 illustrates another example of a system, to which some example embodiments may be applied. In this example, the PSU 422 may be managed through management protocols 423 of the base station, or the PSU 422 may be connected directly to the NMS 410 through a cell site router 421. Alternatively, the management protocols 423 may be outside of the cell site in a separate element.

Figure 5:
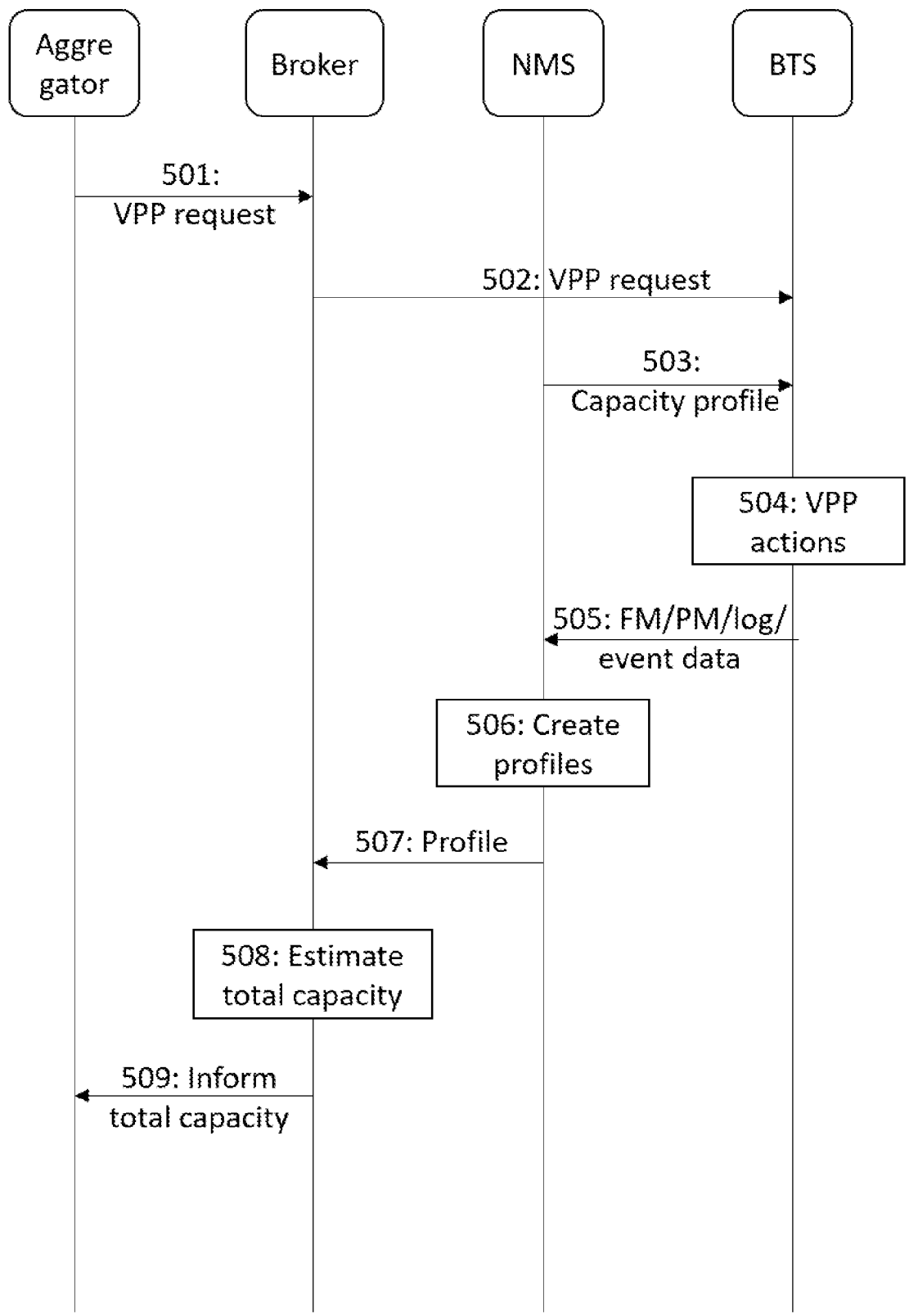
FIG. 5 illustrates a signaling diagram according to an example embodiment.

FIG. 5 illustrates a signaling diagram according to an example embodiment, wherein the VPP broker communicates directly with a plurality of base stations.

Referring to FIG. 5, a VPP aggregator sends 501 a VPP request to the VPP broker. The VPP request may comprise, for example, a request to upregulate or a request to downregulate. Upregulation may be needed, when the frequency of the power grid drops too much and the load towards the power grid needs to be decreased by discharging BTS batteries. Downregulation may be needed in the opposite situation, i.e., when the load towards the power grid needs to be increased by charging the BTS batteries. Herein the term "sending" may refer to transmitting.

The VPP broker sends 502 a VPP request to the base stations through a direct fast link between the VPP broker and the base stations. In other words, the broker may transmit one or more requests for charging or discharging batteries of a plurality of base stations, wherein the plurality of base stations comprise at least a first group of base stations associated with a first communications service provider, and a second group of base stations associated with a second communications service provider different to the first communications service provider.

An NMS of a given CSP sends 503 a capacity profile to a given base station of that CSP.

A given base station performs 504 one or more VPP actions based on the VPP request received from the VPP broker and the capacity profile received from the NMS. For example, the base station may charge or discharge its batteries for a certain energy amount or time duration, or do nothing.

Alternatively, in case the base station has an active alarm, the base station may send a negative acknowledgement (NACK) to the broker. In this case, the broker may select another base station to meet the requirement set by the aggregator.

A given base station transmits 505 fault management (FM) data, performance management (PM) data, log data, and/or event data to the NMS.

A given NMS creates 506 profiles per base station and per network/area based at last partly on the data received from the base stations in the network/area. The NMS may create a profile for each base station and for defined areas involving multiple base stations. The profile may indicate how much battery capacity is available at different times (e.g., with 15-minute resolution).

A given NMS provides 507 the available network/area profile to the VPP broker. The profile provided by the NMS may indicate the battery capacity of its corresponding CSP, i.e., for a single CSP.

The VPP broker estimates 508 the total VPP capacity for multiple CSPs based on the profiles received from the NMSs. The total VPP capacity may refer to the total available battery capacity over multiple CSP networks. In other words, the VPP broker estimate a total available battery capacity for multiple networks or areas at different times based at least partly on the available battery capacity per network or area (as indicated by the profile received from the corresponding NMS). That is, the VPP broker may receive capacity profiles from multiple NMSs of different CSPs, and the VPP broker may combine these capacity profiles into a single profile indicating the total VPP capacity (i.e., aggregate the capacities from multiple CSPs).

The VPP broker informs 509 the estimated total VPP capacity to the VPP aggregator. The estimated total VPP capacity may be greater than or equal to the promised/requested VPP capacity. The VPP aggregator may also collect information about the total VPP capacity of its other customers or tenants and use this information to negotiate with a power grid operator to provide energy to the power grid.

Figure 6:
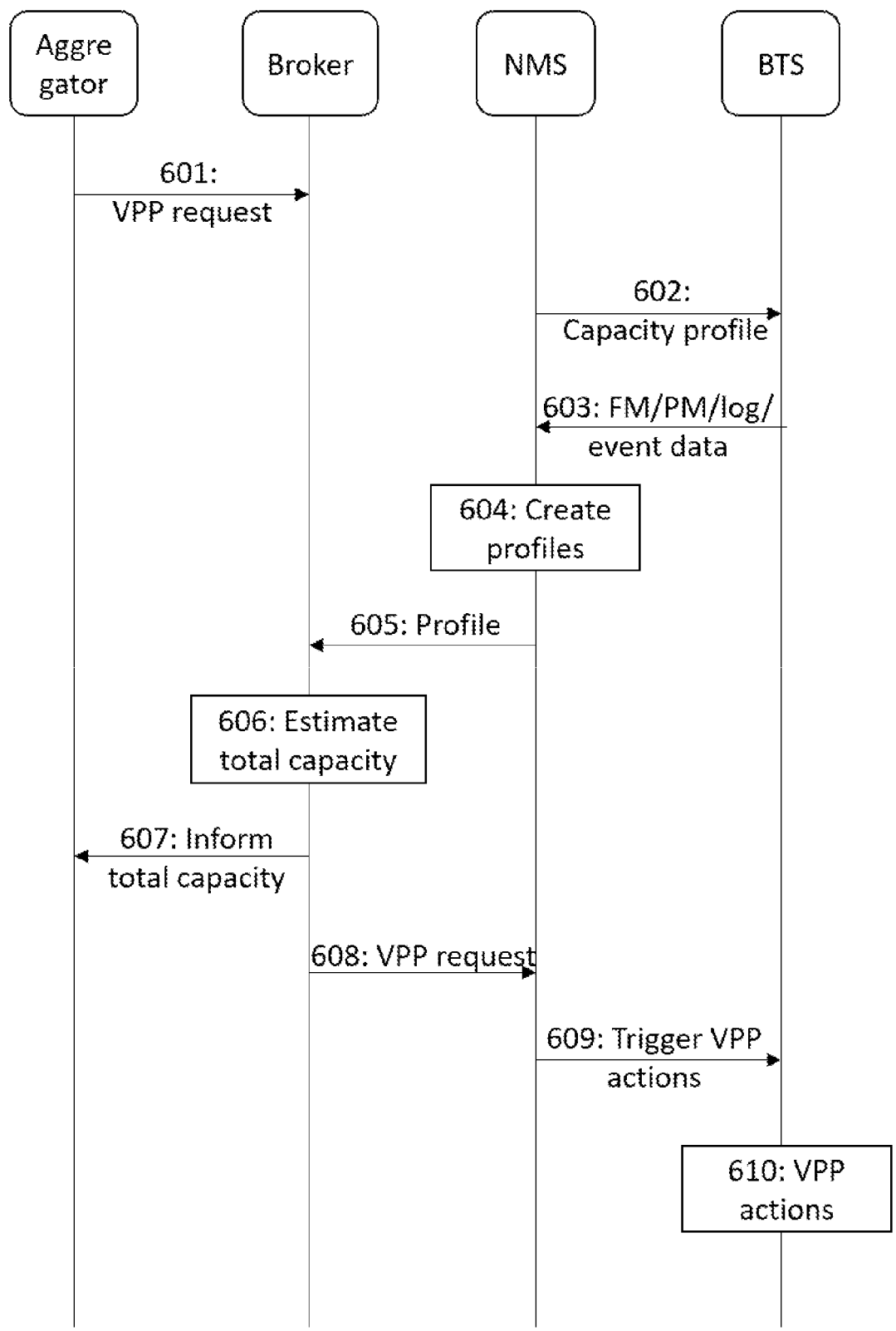
FIG. 6 illustrates a signaling diagram according to an example embodiment.

FIG. 6 illustrates a signaling diagram according to an example embodiment for NMS-based VPP with frequency monitoring.

Referring to FIG. 6, a VPP aggregator sends 601 a VPP request to the VPP broker. The VPP request may comprise, for example, a request to upregulate or a request to down-regulate.

A given NMS of a CSP sends 602 a capacity profile to the base stations of the CSP. It should be noted some other network element may alternatively be used to perform the role of the NMS in FIG. 6.

A given base station transmits 603 fault management (FM) data, performance management (PM) data, log data, and/or event data to the NMS.

A given NMS creates 604 profiles per base station and per network/area based at last partly on fault management (FM) data, performance management (PM) data, log data, and/or event data received from the base stations in the network/area. The NMS may create a profile for each base station and for defined areas involving multiple base stations. The profile may indicate how much battery capacity is available at different times (e.g., with 15-minute resolution).

A given NMS provides 605 the available network/area profile to the VPP broker.

The VPP broker estimates 606 the total VPP capacity based on the profile. In other words, the VPP broker estimate a total available battery capacity for multiple networks or areas at different times based at least partly on the available battery capacity per network or area (as indicated by the profile received from the corresponding NMS).

The VPP broker informs 607 the total VPP capacity to the VPP aggregator. The estimated total VPP capacity may be greater than or equal to the promised/requested VPP capacity.

The VPP broker sends 608 a VPP request to one or more NMSs. In other words, the VPP broker may transmit one or more requests for charging or discharging batteries of a plurality of base stations, wherein the plurality of base stations comprise at least a first group of base stations associated with a first communications service provider, and a second group of base stations associated with a second communications service provider different to the first communications service provider.

Based on the received VPP request, a given NMS sends 609 an indication to one or more base stations to trigger the base station to perform one or more VPP actions. For example, the NMS may indicate the base station to start monitoring the power grid frequency and to charge or discharge the batteries accordingly. As another example, the NMS may directly indicate/command the base station to perform at least one of the following: start or stop discharging energy to the power grid, or start or stop operating the base station on battery power (i.e., the base station does not have to monitor the grid frequency in case of such a direct indication/command).

A given base station performs 610 the one or more VPP actions based on the indication received from the NMS and/or the capacity profile received from the NMS. For example, the base station may discharge its batteries to the power grid for a certain energy amount or amount of time based on a measured frequency of the power grid, for example if the measured frequency is below a threshold. As another example, in case of the direct indication/command from the NMS, the base station may perform at least one of the following: start or stop discharging energy to the power grid, or start or stop operating the base station on battery power (i.e., the base station does not have to monitor the grid frequency in case of such a direct indication/command). Alternatively, the base station may do nothing.

Figure 7:
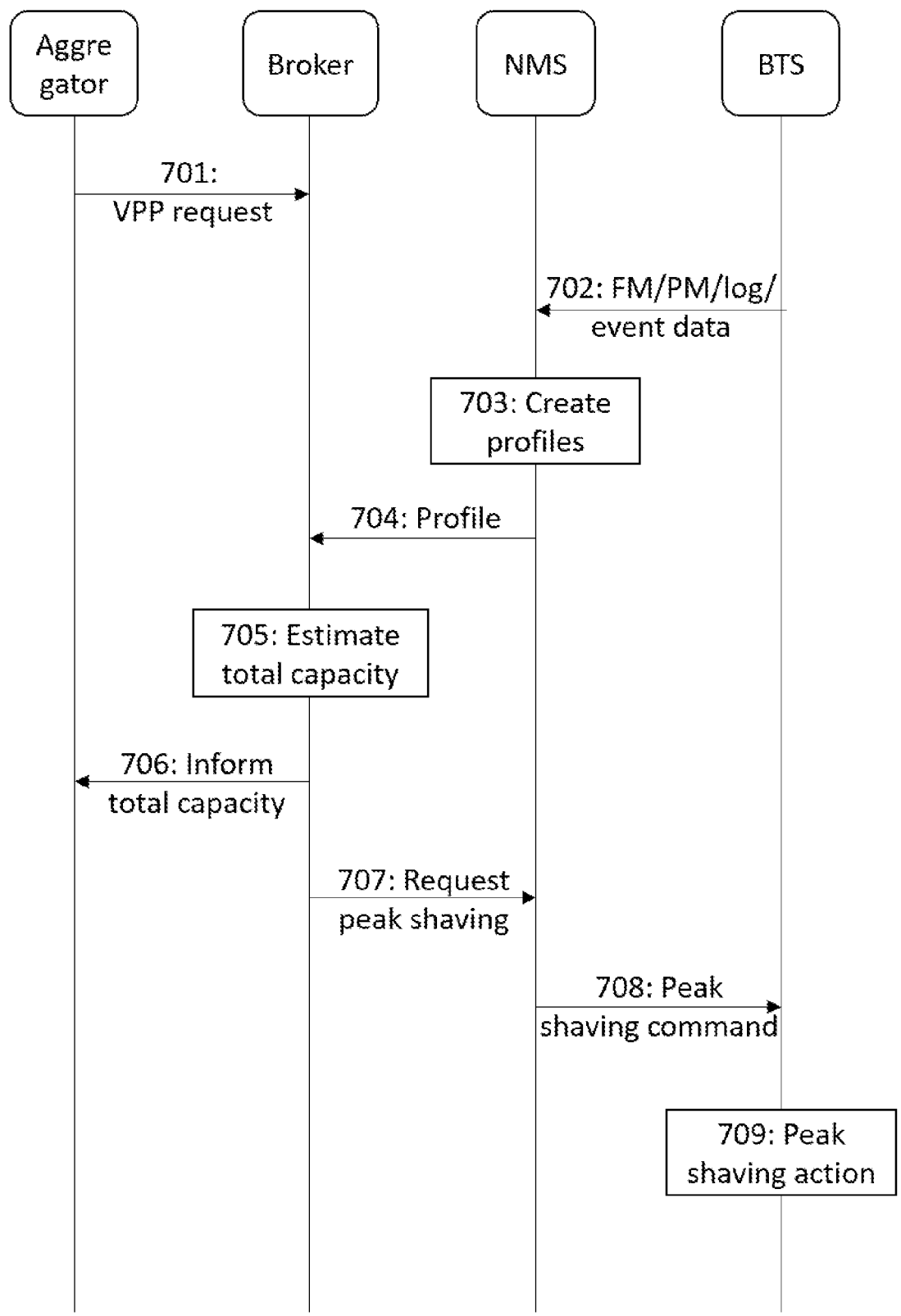
FIG. 7 illustrates a signaling diagram according to an example embodiment.

FIG. 7 illustrates a signaling diagram according to an example embodiment for peak shaving and VPP.

Peak shaving refers to leveling out peaks in electricity use. In this case, peak shaving means discharging the BTS batteries when electricity price is high (e.g., above a first threshold), and charging the BTS batteries when electricity price is low (e.g., below a second threshold).

Referring to FIG. 7, a VPP aggregator sends 701 a VPP request to the VPP broker. The VPP request may comprise, for example, a request to upregulate or a request to down-regulate.

A given base station transmits 702 fault management (FM) data, performance management (PM) data, log data, and/or event data to an NMS.

A given NMS creates 703 profiles per base station and per network/area based at last partly on the data received from the base stations in the network/area. The NMS may create a profile for each base station and for defined areas involving multiple base stations. The profile may indicate how much battery capacity is available at different times (e.g., with 15-minute resolution).

A given NMS provides 704 the available network/area profile to the VPP broker.

The VPP broker estimates 705 the total VPP capacity based on the profile. In other words, the VPP broker estimate a total available battery capacity for multiple networks or areas at different times based at least partly on the available battery capacity per network or area (as indicated by the profile received from the corresponding NMS).

The VPP broker informs 706 the total VPP capacity to the VPP aggregator. The estimated total VPP capacity may be greater than or equal to the promised/requested VPP capacity.

The VPP broker sends 707 a peak shaving request to one or more NMSs. In other words, the VPP broker may transmit one or more requests for charging or discharging batteries of a plurality of base stations, wherein the plurality of base stations comprise at least a first group of base stations associated with a first communications service provider, and a second group of base stations associated with a second communications service provider different to the first communications service provider.

For example, the VPP broker may send the peak shaving request based on a pre-defined rule that takes electricity price and battery capacity and/or data traffic of the base station into account. As an example, such a rule may indicate that if the electricity price is above a threshold (i.e., energy demand is high compared to supply), then energy may be discharged from the BTS batteries according to an energy amount allowed by the battery capacity and/or data traffic situation of a given base station. As another example, such a rule may indicate that if the electricity price is below a threshold (i.e., energy demand is low compared to supply), then the BTS batteries may be charged from the power grid.

A given NMS sends 708 a peak shaving command to one or more base stations based on the peak shaving request received from the VPP broker.

A given base station performs 709 a peak shaving action based on the peak shaving command received from the NMS. For example, the base station may discharge its batteries for a certain energy amount or amount of time, or charge the batteries for a certain energy amount or amount of time. Alternatively, the base station may do nothing.

Table 1 below presents an example of the VPP request from the aggregator to the broker (block 501 of FIG. 5), as well as other associated signaling.

TABLE 1

| Source-target | Command | Parameters | Description |
|---|---|---|---|
| From aggregator to broker | StartVPP | Upregulation \| downregulation | Request to upregulate or downregulate. |
| | | Start | Request start of VPP action. |
| | | (Time) | Time when VPP started and stopped. |
| | | Energy amount | Needed energy amount for VPP. |
| | | Power | Needed amount of power for VPP. |
| | | Area | Area where VPP action needed, based on geographical area or an area in power grid hierarchy (area below a transformer). |
| From broker to aggregator | ResponseToStartVPP | ACK \| NACK (reason) | |
| From aggregator to broker | StopVPP | (time) | Request to stop VPP action. The stop can be immediate or at a certain time. |
| From broker to aggregator | ResponseToStopVPP | ACK \| NACK (reason) | |
| From aggregator to broker | StandbyRequest | Start | Request broker to be prepared for VPP actions. |
| | | (time) | Time window for standby. |
| From broker to aggregator | ResponseToStandbyRequest | ACK \| NACK (reason) | |
| From aggregator to broker | StandbyEnd | Stop \|time\| | Stop standby immediately or at a certain time. |
| From broker to aggregator | ResponseToStandbyEnd | ACK \| NACK (reason) | |

Table 2 below presents an example of the VPP request from the broker to a given base station (block 502 of FIG. 5), as well as other associated signaling.

TABLE 2

| Source-target | Command | Parameters | Description |
|---|---|---|---|
| From broker to BTS | StartVPP | Charge \| discharge (Energy amount) | Request to charge or discharge. Needed energy amount for VPP. Alternatively, the BTS may use the capacity profile to decide the energy amount. |
| From BTS to broker | ResponseToStartVPP | ACK \| NACK (reason) | Reason = active alarm, BTS operated with batteries |
| From broker to BTS | StopVPP | (time) | Request to stop VPP action. The stop can be immediate or at a certain time. |
| From BTS to broker | ResponseToStopVPP | ACK \| NACK (reason) | |

Table 3 below presents an example of the capacity profile per base station from the NMS to a given base station (block 503 of FIG. 5, block 602 of FIG. 6), and the response from the base station. The capacity may be indicated, for example, as a percentage of the total battery capacity, as an amount of time (e.g., s/min/h), or an energy amount (e.g., Wh).

TABLE 3

| Source-target | Command | Parameters | Description |
|---|---|---|---|
| From NMS to BTS | Capacity information | Time window, available capacity | NMS informs available total battery capacity at different times of day with a given resolution (e.g., 15-minute slots) |
| From BTS to NMS | Response | ACK \| NACK (reason) | |

Table 4 below presents an example of the network/area power profile from the NMS to the broker (block 507 of FIG. 5, block 605 of FIG. 6, block 704 of FIG. 7), and the response from the broker. The capacity may be indicated, for example, as a percentage of the total battery capacity, as an amount of time (e.g., s/min/h), or an energy amount (e.g., Wh). The capacity information sent from the NMS may comprise information from a single CSP.

TABLE 4

| Source-target | Command | Parameters | Description |
|---|---|---|---|
| From NMS to broker | Capacity information | Time window, available capacity, area | NMS informs available total battery capacity at different times of day with a given resolution (e.g., 15-minute slots) and area. The area may be based on a geographical area or an area in a power grid hierarchy (area below a transformer). |
| From broker to NMS | Response | ACK \| NACK (reason) | |

Table 5 below presents an example of informing the total VPP capacity from the broker to the aggregator (block 509 of FIG. 5, block 607 of FIG. 6, block 706 of FIG. 7), and the response from the aggregator to the broker. The total capacity may be indicated, for example, as an amount of time (e.g., s/min/h), or an energy amount (e.g., Wh). The capacity information sent from the broker may comprise aggregated information from multiple CSPs.

TABLE 5

| Source-target | Command | Parameters | Description |
|---|---|---|---|
| From broker to aggregator | Capacity information | Time window, available capacity, area | Broker informs available total battery capacity at different times of day with a given resolution (e.g., 15-minute slots) and area. The area may be based on a geographical area or an area in a power grid hierarchy (area below a transformer). |
| From aggregator to broker | Response | ACK | NACK (reason) | |

Table 6 below presents an example of the VPP request from the broker to the NMS (block 608 of FIG. 6), as well as other associated signaling.

TABLE 6

| Source-target | Command | Parameters | Description |
|---|---|---|---|
| From broker to NMS | StartVPP | Charge | discharge | Request to charge or discharge. |
| | | Time | Start and stop time for VPP action. |
| | | Energy amount | Requested energy amount for VPP action. |
| | | Power | Requested amount of power for VPP action. |
| From NMS to broker | ResponseToStart VPP | ACK | NACK (reason) | |
| From NMS to broker | CapacityInfo | Energy amount Power | Available battery capacity (energy or power, which can be less than requested) |

Table 7 below presents an example of the peak shaving request from the broker to the NMS for a given area (block 707 of FIG. 7), and the response from the NMS.

TABLE 7

| Source-target | Command | Parameters | Description |
|---|---|---|---|
| From broker to NMS | Peak shaving command | Charge | discharge Start time Stop time Energy amount | Command to charge or discharge. Start time of operation. Stop time of operation. Requested energy amount. |
| From NMS to broker | Response | ACK | NACK (reason) | |

Table 8 below presents an example of the peak shaving command from the NMS to a given base station (block 708 of FIG. 7), and the response from the base station.

TABLE 8

| Source-target | Command | Parameters | Description |
|---|---|---|---|
| From NMS to BTS | Peak shaving command | Charge | discharge Start time Stop time Energy amount | Command to charge or discharge. Start time of operation. Stop time of operation. Requested energy amount. |
| From BTS to NMS | Response | ACK | NACK (reason) | |

Figure 8:
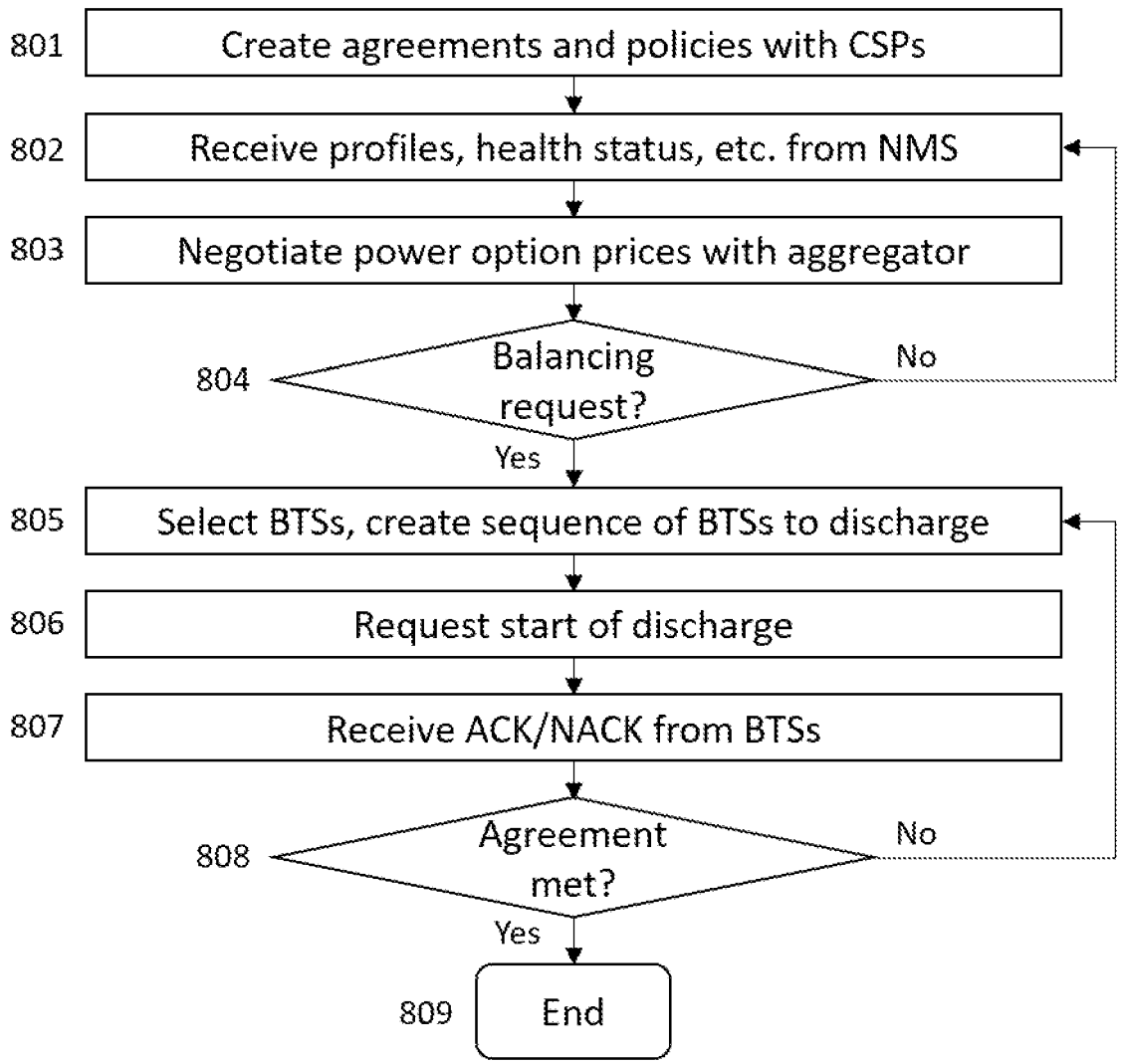
FIG. 8 illustrates a flow chart according to an example embodiment.
Figure 9:
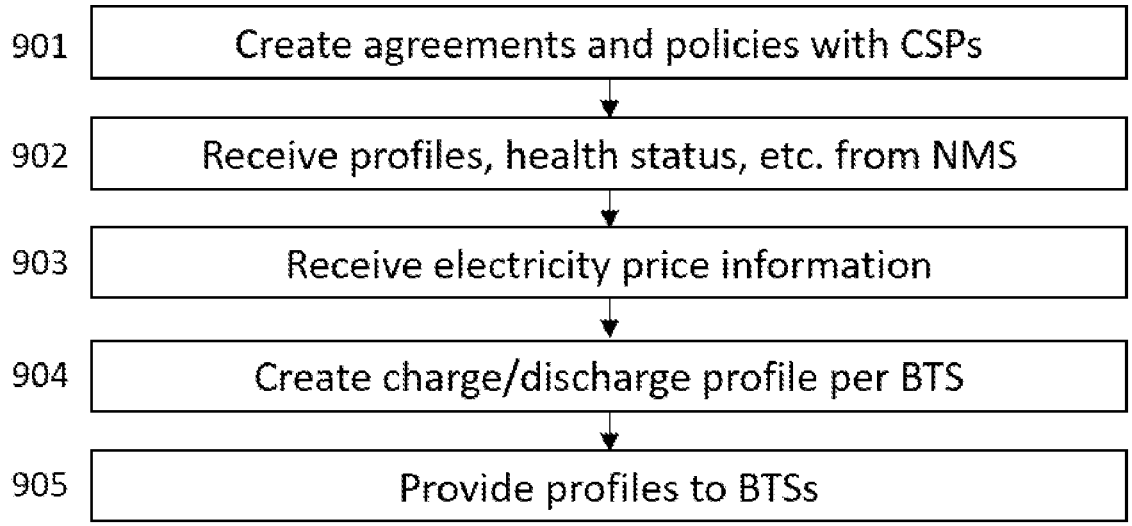
FIG. 9 illustrates a flow chart according to an example embodiment.

The VPP broker can be implemented for a VPP scenario or a peak shaving scenario, or in a combination of these. FIG. 8 illustrates the decision-making logic for the VPP scenario, and FIG. 9 illustrates the decision-making logic for the peak shaving scenario.

FIG. 8 illustrates a flow chart according to an example embodiment of a method performed by an apparatus such as, or comprising, or comprised in, a VPP broker, a server, or any other computing device. This example embodiment illustrates a VPP scenario.

Referring to FIG. 8, in block 801, the VPP broker creates agreements and policies with CSPs.

In block 802, the VPP broker receives capacity profiles, health status, etc. from one or more NMSs. Alternatively, or additionally, the VPP broker may receive data traffic profiles from the one or more NMSs indicating BTS data traffic status. This may be a continuous process. Herein the health status may refer to BTS health status. For example, the health status of a base station may indicate whether there are fault management alarms (service-related alarms) associated with the base station. For example, the discharging may not be allowed, if the health status is not good enough.

In block 803, the VPP broker negotiates power option prices with one or more VPP aggregators. The negotiations with aggregators are based on information received in blocks 801 and 802, i.e., the agreements and policies and the available capacity of cells in participating networks. The calculation of available capacity is based on an availability estimation, which in turn is based on previous observations of behavior of each cell and aggregated to region or network level estimation. This availability estimation may be extracted from the cell history by using statistical means or learned from there with machine learning techniques such as a deep neural network.

The broker may select the aggregator to whom the available energy will be provided, and possibly also organize an auction and select a winning offer based on bids. The selection logic may be based on actionable knowledge, represented in some known format such as a set of decision rules, decision-tree, or extracted from previous auctions with statistical analysis techniques or learned from them with some machine learning technology such as a deep neural network or Bayesian network, to which knowledge extracted with statistical techniques may be given as a priori information.

In block 804, the broker checks whether a grid balancing request (VPP request) is received from an aggregator. For example, the grid balancing request may mean a request to feed energy to the power grid or to operate base stations with battery power.

If no grid balancing request is received (block 804: no), then the process returns to block 802 and continues from there.

In block 805, if the grid balancing request is received (block 804: yes), the broker schedules an order, timing and amounts, i.e., a plan according to which participating cells will feed energy to the power grid or operates the base stations with battery power. In other words, the broker selects one or more groups of base stations and creates a sequence for discharging energy from the base station batteries to the power grid. This scheduling may be again based on some actionable knowledge as described above, or it may be accompanied by an algorithm, into which the broker has encoded gained knowledge of the best strategy and tactics known about how to organize the energy feed, so that all the agreed commitments are met. The algorithm may use the actionable knowledge mentioned above.

In block 806, the broker sends a VPP request to start discharging energy to the power grid or operating the base stations with battery power according to the selected sequence. The broker may send the VPP request directly to the selected one or more groups of base stations, or via NMS. For example, the one or more groups of base stations may comprise at least a first group of base stations associated with a first communications service provider, and a second group of base stations associated with a second communications service provider different to the first communications service provider.

In block 807, the broker receives an acknowledgement (ACK) or a negative acknowledgement (NACK) from a given group of base stations to indicate whether the group of base stations accepted the request or not.

In block 808, the broker checks whether the agreements made with the CSPs are fulfilled. Herein the agreements may refer to promised VPP capacity over multiple CSPs.

If the agreements are not fulfilled (block 808: no), then the process may return to block 805 and continue from there.

In block 809, if the agreements are fulfilled (block 808: yes), then the process may end.

FIG. 9 illustrates a flow chart according to an example embodiment of a method performed by an apparatus such as, or comprising, or comprised in, a VPP broker, a server, or any other computing device. This example embodiment illustrates a peak shaving scenario.

Referring to FIG. 9, in block 901, the VPP broker creates agreements and policies with CSPs.

In block 902, the VPP broker receives capacity profiles, BTS health status, etc. from one or more NMSs. This may be a continuous process. The capacity profiles may comprise information indicating at least an available battery capacity per network or area at different times, wherein the network or area comprises a group of base stations associated with a CSP.

In block 903, the broker receives electricity price information from the electricity market. The electricity price information may be received beforehand, for example 24 hours before the decision making of block 904. The electricity price information may be used as an indicator for energy demand.

In block 904, the broker determines, or creates, a charge or discharge profile per base station based on the information received in blocks 901-903. This may be implemented in a similar manner as the decision-making steps of FIG. 8 described above.

The charge or discharge profile may indicate at least one of the following: a start time for the charging or the discharging, a stop time for the charging or the discharging, an energy amount to be charged or discharged, or an amount of power for the charging or the discharging. The discharging may mean discharging energy from the BTS batteries to the power grid, or using the BTS batteries to operate the base station (i.e., using the batteries to power the base station instead of drawing power from the power grid to power the base station).

In block 905, the broker provides the charge or discharge profile to a plurality of base stations. The plurality of base stations may comprise at least a first group of base stations associated with a first communications service provider, and a second group of base stations associated with a second communications service provider different to the first communications service provider.

Figure 10:
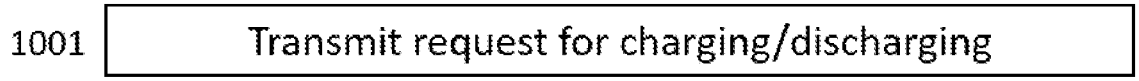
FIG. 10 illustrates a flow chart according to an example embodiment.

FIG. 10 illustrates a flow chart according to an example embodiment of a method performed by an apparatus such as, or comprising, or comprised in, a VPP broker, a server, or any other computing device.

Referring to FIG. 10, in block 1001, one or more requests for charging or discharging batteries of a plurality of base stations are transmitted, wherein the plurality of base stations comprise at least a first group of base stations associated with a first communications service provider, and a second group of base stations associated with a second communications service provider different to the first communications service provider.

In case the request is for discharging, then the one or more requests may comprise a request for discharging energy from the batteries to a power grid, or a request for discharging energy from the batteries to operate the plurality of base stations with battery power (instead of drawing energy from the power grid to operate the plurality of base stations).

The one or more requests may indicate at least one of the following: a request to start the charging or the discharging, a request to stop the charging or the discharging, a start time for the charging or the discharging, a stop time for the charging or the discharging, an energy amount to be charged or discharged, or an amount of power for the charging or the discharging.

Figure 11:
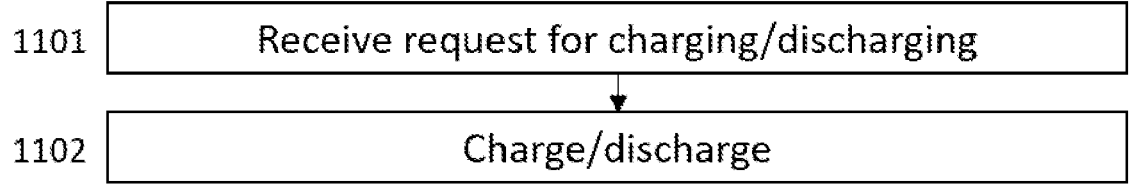
FIG. 11 illustrates a flow chart according to an example embodiment.

FIG. 11 illustrates a flow chart according to an example embodiment of a method performed by an apparatus such as, or comprising, or comprised in, a base station. Herein the base station may refer to a telecommunications base station, such as a base station of a radio access network.

Referring to FIG. 11, in block 1101, a request for charging or discharging one or more batteries of the base station is received, wherein the request indicates at least one of the following: a request to start the charging or the discharging, a start time for the charging or the discharging, a stop time for the charging or the discharging, an energy amount to be charged or discharged, or an amount of power for the charging or the discharging.

In block 1102, the one or more batteries are charged or discharged based at least partly on the request.

The discharging may mean feeding energy from the one or more batteries to the power grid, or using the one or more batteries to operate the base station with battery power (instead of drawing energy from the power grid to operate the base station).

The blocks, related functions, and information exchanges (messages) described above by means of FIGS. 5-11 are in no absolute chronological order, and some of them may be performed simultaneously or in an order differing from the described one. Other functions can also be executed between them or within them, and other information may be sent, and/or other rules applied. Some of the blocks or part of the blocks or one or more pieces of information can also be left out or replaced by a corresponding block or part of the block or one or more pieces of information.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

Figure 12:
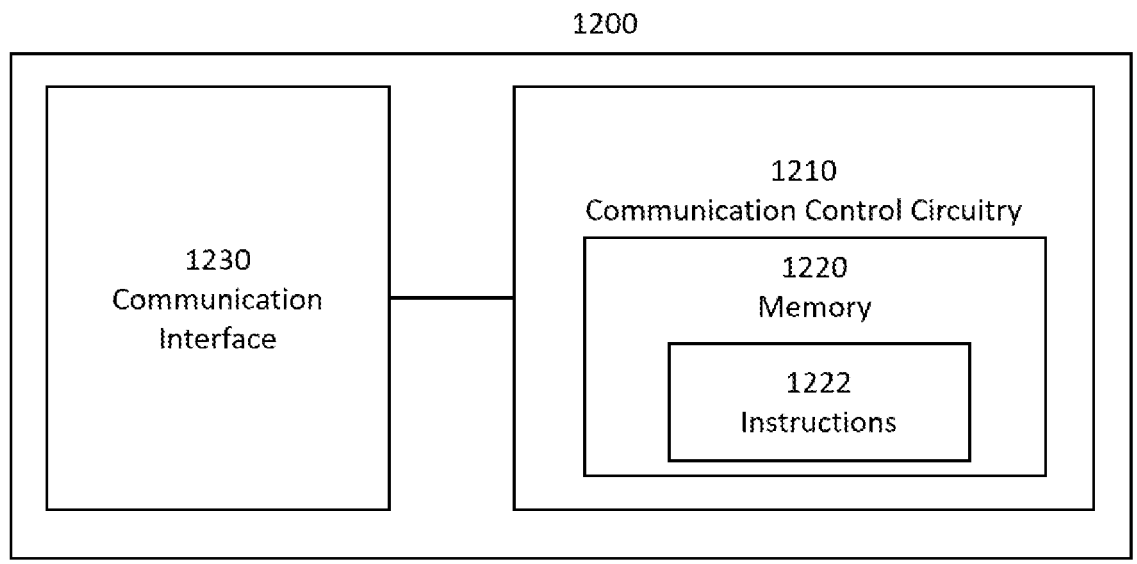
FIG. 12 illustrates an example of an apparatus.

FIG. 12 illustrates an example of an apparatus 1200 comprising means for performing one or more of the example embodiments described above. For example, the apparatus 1200 may be an apparatus such as, or comprising, or comprised in, a VPP broker, a server, or any other computing device.

The apparatus 1200 may comprise, for example, a circuitry or a chipset applicable for realizing one or more of the example embodiments described above. The apparatus 1200 may be an electronic device comprising one or more electronic circuitries. The apparatus 1200 may comprise a communication control circuitry 1210 such as at least one processor, and at least one memory 1220 storing instructions 1222 which, when executed by the at least one processor, cause the apparatus 1200 to carry out one or more of the example embodiments described above. Such instructions 1222 may, for example, include a computer program code (software), wherein the at least one memory and the computer program code (software) are configured, with the at least one processor, to cause the apparatus 1200 to carry out one or more of the example embodiments described above. The at least one processor and the at least one memory storing the instructions may provide the means for providing or causing the performance of any of the methods and/or blocks described above.

The processor is coupled to the memory 1220. The processor is configured to read and write data to and from the memory 1220. The memory 1220 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1220 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1220 or, alternatively or additionally, they may be received, by the apparatus, via an electromagnetic carrier signal and/or may be copied from a physical entity such as a computer program product. Execution of the computer readable instructions causes the apparatus 1200 to perform one or more of the functionalities described above.

The memory 1220 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some example embodiments, structures of the frames used in the detected neighbour cells.

The apparatus 1200 may further comprise a communication interface 1230 comprising hardware and/or software for realizing communication connectivity according to one or more communication protocols. The communication interface 1230 comprises at least one transmitter (Tx) and at least one receiver (Rx) that may be integrated to the apparatus 1200 or that the apparatus 1200 may be connected to. The communication interface 1230 may provide means for performing some of the blocks for one or more example embodiments described above. The communication interface 1230 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 1230 provides the apparatus with radio communication capabilities to communicate in the cellular communication system. The communication interface may, for example, provide a radio interface to one or more user devices. The apparatus 1200 may further comprise another interface towards a core network such as the network coordinator apparatus or AMF, and/or to the access nodes of the cellular communication system.

It is to be noted that the apparatus 1200 may further comprise various components not illustrated in FIG. 12. The various components may be hardware components and/or software components.

Figure 13:
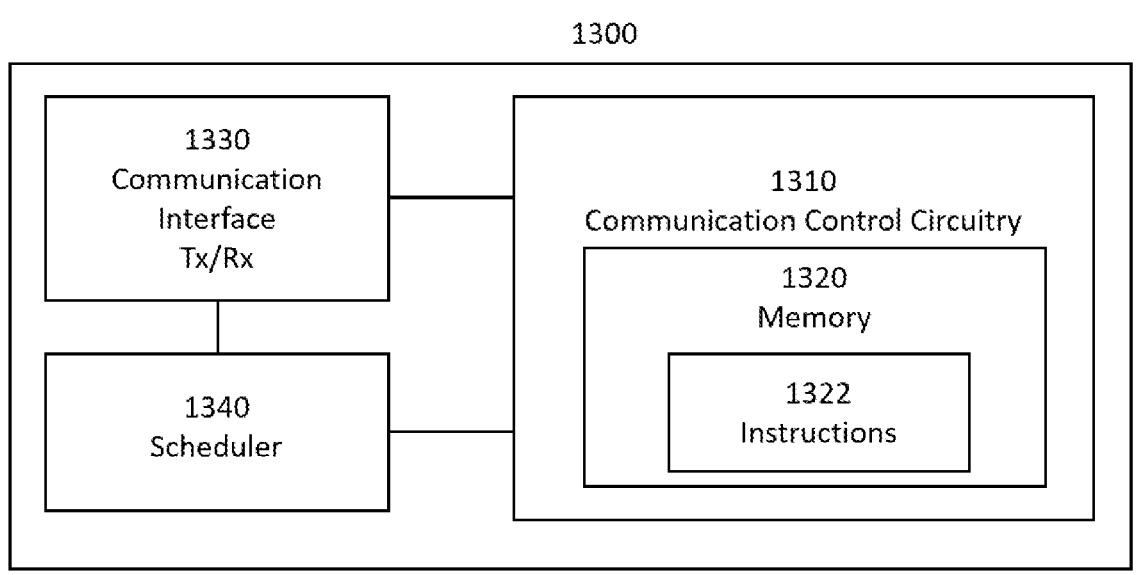
FIG. 13 illustrates an example of an apparatus.

FIG. 13 illustrates an example of an apparatus 1300 comprising means for performing one or more of the example embodiments described above. For example, the apparatus 1300 may be an apparatus such as, or comprising, or comprised in, a base station. The base station may correspond to the access node 104 of FIG. 1. The base station may also be referred to, for example, as a network node, a network element, a radio access network (RAN) node, a next generation radio access network (NG-RAN) node, a NodeB, an eNB, a gNB, a base transceiver station (BTS), an NR base station, a 5G base station, an access node, an access point (AP), a relay node, a repeater, an integrated access and backhaul (IAB) node, an IAB donor node, a distributed unit (DU), a central unit (CU), a baseband unit (BBU), a radio unit (RU), a radio head, a remote radio head (RRH), or a transmission and reception point (TRP).

The apparatus 1300 may comprise, for example, a circuitry or a chipset applicable for realizing one or more of the example embodiments described above. The apparatus 1300 may be an electronic device comprising one or more electronic circuitries. The apparatus 1300 may comprise a communication control circuitry 1310 such as at least one processor, and at least one memory 1320 storing instructions 1322 which, when executed by the at least one processor, cause the apparatus 1300 to carry out one or more of the example embodiments described above. Such instructions 1322 may, for example, include a computer program code (software), wherein the at least one memory and the computer program code (software) are configured, with the at least one processor, to cause the apparatus 1300 to carry out one or more of the example embodiments described above. The at least one processor and the at least one memory storing the instructions may provide the means for providing or causing the performance of any of the methods and/or blocks described above.

The processor is coupled to the memory 1320. The processor is configured to read and write data to and from the memory 1320. The memory 1320 may comprise one or more memory units. The memory units may be volatile or non-volatile. It is to be noted that there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The term "non-transitory," as used herein, is a limitation of the medium itself (i.e., tangible, not a signal) as opposed to a limitation on data storage persistency (e.g., RAM vs. ROM). The memory 1320 stores computer readable instructions that are executed by the processor. For example, non-volatile memory stores the computer readable instructions and the processor executes the instructions using volatile memory for temporary storage of data and/or instructions.

The computer readable instructions may have been pre-stored to the memory 1320 or, alternatively or additionally, they may be received, by the apparatus, via an electromagnetic carrier signal and/or may be copied from a physical entity such as a computer program product. Execution of the computer readable instructions causes the apparatus 1300 to perform one or more of the functionalities described above.

The memory 1320 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some example embodiments, structures of the frames used in the detected neighbour cells.

The apparatus 1300 may further comprise a communication interface 1330 comprising hardware and/or software for realizing communication connectivity according to one or more communication protocols. The communication interface 1330 comprises at least one transmitter (Tx) and at least one receiver (Rx) that may be integrated to the apparatus 1300 or that the apparatus 1300 may be connected to. The communication interface 1330 may provide means for performing some of the blocks for one or more example embodiments described above. The communication interface 1330 may comprise one or more components, such as: power amplifier, digital front end (DFE), analog-to-digital converter (ADC), digital-to-analog converter (DAC), frequency converter, (de)modulator, and/or encoder/decoder circuitries, controlled by the corresponding controlling units.

The communication interface 1330 provides the apparatus with radio communication capabilities to communicate in the cellular communication system. The communication interface may, for example, provide a radio interface to one or more user devices. The apparatus 1300 may further comprise another interface towards a core network such as the network coordinator apparatus or AMF, and/or to the access nodes of the cellular communication system.

The apparatus 1300 may further comprise a scheduler 1340 that is configured to allocate radio resources. The scheduler 1340 may be configured along with the communication control circuitry 1310 or it may be separately configured.

It is to be noted that the apparatus 1300 may further comprise various components not illustrated in FIG. 13. The various components may be hardware components and/or software components.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of example embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the example embodiments described above, but may vary within the scope of the claims. Therefore, all words and expressions should be interpreted broadly, and they are intended to illustrate, not to restrict, the example embodiments.

The invention claimed is:

1. An apparatus comprising:
    at least one processor; and
    at least one memory storing instructions which, when executed by the at least one processor, cause the apparatus at least to:
    select one or more groups of base stations from multiple groups of base stations of multiple communications service providers for charging or discharging batteries of the one or more groups of base stations, wherein the selection is based at least on one or more agreements with the multiple communications service providers, wherein the one or more agreements indicate a promised battery capacity of the multiple communications service providers;
    determine a schedule for charging or discharging of the batteries of the selected one or more groups of base stations, wherein the schedule comprises a timing and an amount of energy to be charged to or discharged from the batteries to satisfy the one or more agreements; and
    transmit one or more requests based on the determined schedule for charging or discharging the batteries of the one or more groups of base stations, wherein the one or more groups of base stations comprise at least a first group of base stations associated with a first communications service provider, and a second group of base stations associated with a second communications service provider different to the first communications service provider.

2. The apparatus according to claim 1, wherein the one or more requests comprise a request for discharging energy from the batteries to a power grid.

3. The apparatus according to claim 1, wherein the one or more requests comprise a request for discharging energy from the batteries to operate the one or more groups of base stations with battery power.

4. The apparatus according to claim 1, wherein the one or more requests indicate at least one of the following: a request to start the charging or the discharging, a request to stop the charging or the discharging, a start time for the charging or the discharging, a stop time for the charging or the discharging, an energy amount to be charged or discharged, or an amount of power for the charging or the discharging.

5. The apparatus according to claim 4, further being caused to:
    receive, from a plurality of network management systems of the multiple communications service providers, information indicating at least an available battery capacity per network or area at different times, wherein the network or area comprises the first group of base stations or the second group of base stations; and
    determine, based at least partly on the information, at least one of the following: the start time for the charging or the discharging, the stop time for the charging or the discharging, the energy amount to be charged or discharged, or the amount of power for the charging or the discharging.

6. The apparatus according to claim 5, wherein the determination is further based on electricity price information.

7. The apparatus according to claim 5, wherein the determination is further based on one or more agreements with the first communications service provider and the second communications service provider, wherein the one or more agreements indicate a promised battery capacity of at least the first communications service provider and the second communications service provider.

8. The apparatus according to claim 5, further being caused to:
    estimate a total available battery capacity for multiple networks or areas at different times based at least partly on the available battery capacity per network or area; and
    transmit information indicating the total available battery capacity at different times.

9. The apparatus according to claim 1, further being caused to:
    receive a grid balancing request indicating to feed energy to a power grid, or to draw energy from the power grid, or to operate the one or more groups of base stations with battery power,
    wherein the one or more requests for charging or discharging the batteries are transmitted based at least partly on the grid balancing request.

10. The apparatus according to claim 9, wherein the grid balancing request indicates at least one of the following: a time for starting the feeding or the drawing, a requested energy amount, a requested amount of power, or an area where the feeding or the drawing is needed.

11. A method comprising:
    selecting one or more groups of base stations from multiple groups of base stations of multiple communications service providers for charging or discharging batteries of the one or more groups of base stations,
    wherein the selection is based at least on one or more agreements with the multiple communications service providers, wherein the one or more agreements indicate a promised battery capacity of the multiple communications service providers;
    determining a schedule for charging or discharging of the batteries of the selected one or more groups of base stations, wherein the schedule comprises a timing and an amount of energy to be charged to or discharged from the batteries to satisfy the one or more agreements; and
    transmitting one or more requests based on the determined schedule for charging or discharging the batteries of the one or more groups of base stations,
    wherein the one or more groups of base stations comprise at least a first group of base stations associated with a first communications service provider, and a second group of base stations associated with a second communications service provider different to the first communications service provider.

12. A non-transitory computer readable medium comprising program instructions which, when executed by an apparatus, cause the apparatus to perform at least the following:
    selecting one or more groups of base stations from multiple groups of base stations of multiple communications service providers for charging or discharging batteries of the one or more groups of base stations,
    wherein the selection is based at least on one or more agreements with the multiple communications service providers, wherein the one or more agreements indicate a promised battery capacity of the multiple communications service providers;
    determining a schedule for charging or discharging of the batteries of the selected one or more groups of base stations, wherein the schedule comprises a timing and an amount of energy to be charged to or discharged from the batteries to satisfy the one or more agreements; and transmitting one or more requests based on the determined schedule for charging or discharging the batteries of the one or more groups of base stations, wherein the one or more groups of base stations comprise at least a first group of base stations associated with a first communications service provider, and a second group of base stations associated with a second communications service provider different to the first communications service provider.

* * * * *